Feb. 27, 1951     G. O. HOFFSTETTER     2,543,288
FERTILIZER SPREADER
Filed July 29, 1946     2 Sheets-Sheet 2
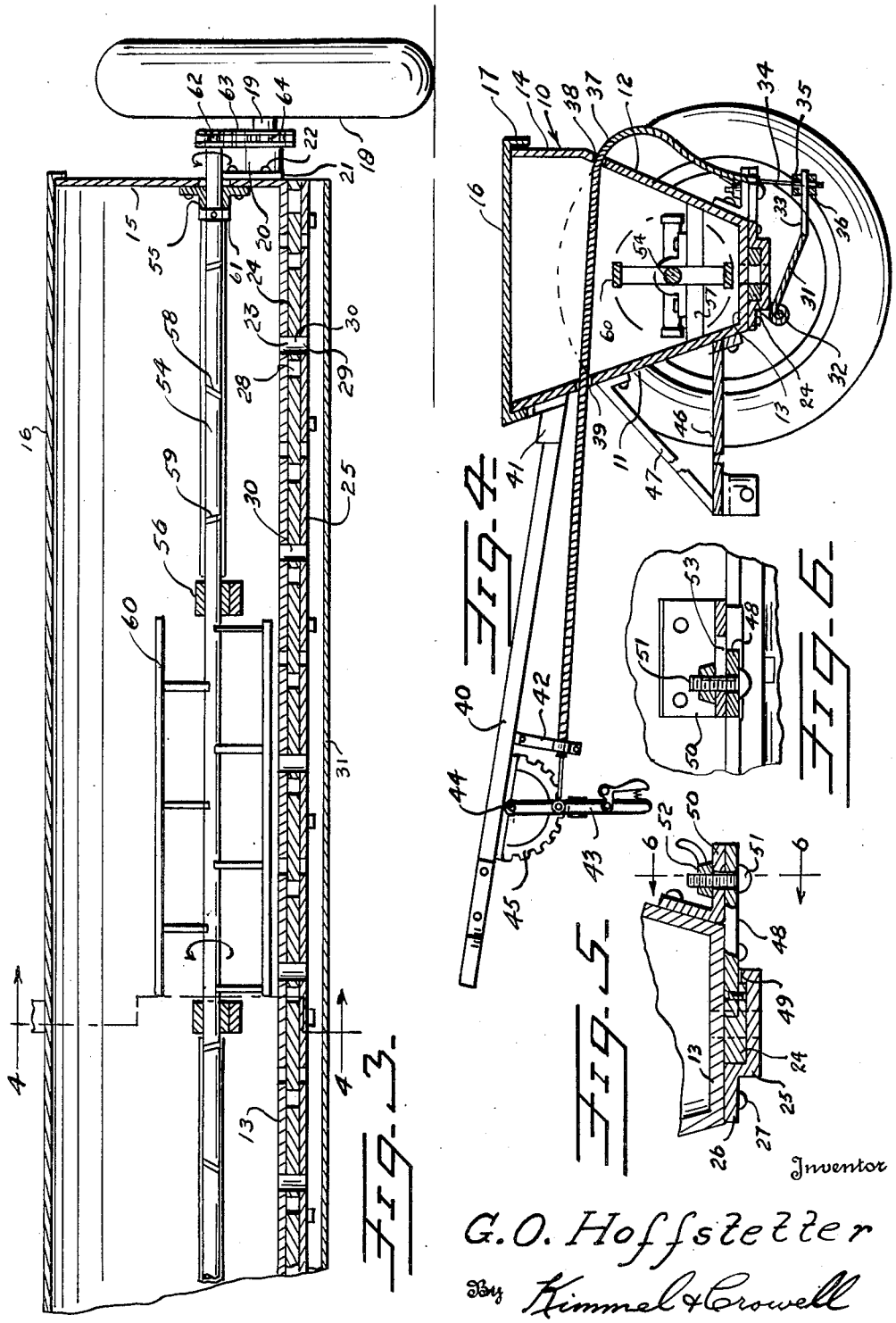
Inventor
G. O. Hoffstetter
By Kimmel & Crowell
Attorneys Patented Feb. 27, 1951

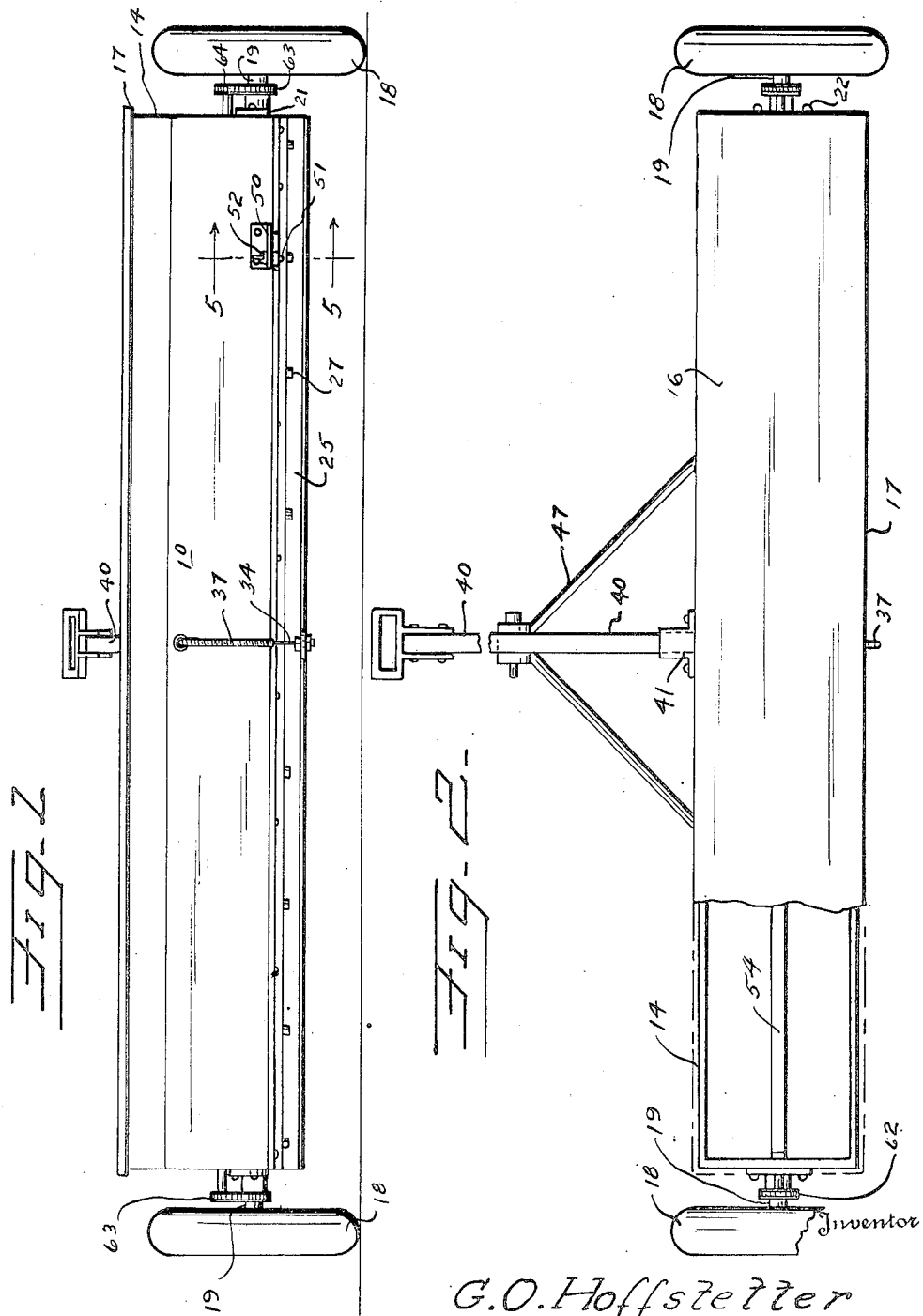

2,543,288

UNITED STATES PATENT OFFICE 2,543,288

FERTILIZER SPREADER

George O. Hoffstetter, Jerseyville, Ill.

Application July 29, 1946, Serial No. 686,922

1 Claim. (Cl. 275—2)

This invention relates to fertilizer spreaders.

An object of this invention is to provide a fertilizer spreader which includes a mobile hopper, agitating means in the hopper, adjustable valve means in the bottom of the hopper, and a combined deflector and valve plate.

Another object of this invention is to provide a spreader of this kind wherein the valve is so constructed that the material may be discharged in streams at selected distances apart.

A further object of this invention is to provide a spreader of this kind which is of simple construction and may be coupled to the rear of a tractor vehicle for pulling over the ground, the agitators in the hopper being operatively coupled to the traction wheels so that the agitators will rotate with movement of the device over the ground.

With the above and other objects in view, my invention consists in the arrangement, combination and details of construction disclosed in the drawings and specification, and then more particularly pointed out in the appended claim.

In the drawings,

Figure 1 is a detail rear elevation of a fertilizer spreader constructed according to an embodiment of this invention, Figure 2 is a plan view, partly broken away, of the device, Figure 3 is a fragmentary enlarged longitudinal section of the device, Figure 4 is a sectional view taken on the line 4—4 of Figure 3, Figure 5 is a fragmentary sectional view taken on the line 5—5 of Figure 1, Figure 6 is a fragmentary sectional view taken on the line 6—6 of Figure 5.

Referring to the drawings, the numeral 10 designates generally an elongated hopper which is formed of a forward upwardly and forwardly inclined wall 11, a rear upwardly and rearwardly inclined rear wall 12, and a bottom wall 13. The rear wall 12 also includes a vertically disposed upper portion 14. The hopper 10 also includes opposite end walls 15.

A cover 16 is adapted to removably engage over the open upper side of the hopper 10 being formed with depending marginal flanges 17 engaging over the sides and ends of the hopper. The hopper 10 is supported by means of a pair of wheels 18 secured to shafts 19. The shafts 19 are journaled in bearings 20 carried by the end walls 15. The bearings 20 are carried by base plates 21 which are fixed by fastening members 22 to the outer sides of the end walls 15.

The bottom 13, as shown in Figure 3, is provided longitudinally thereof with a plurality of spaced apart openings 23. A discharge regulating plate 24 engages the under side of the bottom wall 13, being slidably disposed in a U-shaped housing 25, having lengthwise flanges 26 which are secured by fastening members 27 to the lower side of the bottom wall 13. The regulating plate 24 is moved to the right, as viewed in Figure 3, to register with all of the openings 23.

The guide member 25 is formed with openings 29 registering with the openings 23. In this manner, when the series 28 of the discharge openings are in register with the openings 23, 29, the maximum discharge of material from the hopper will be provided. A second series of openings 30 are formed through the plate 24, and in the present instance, the openings 30 are alternately disposed with respect to the openings 28 so that when openings 30 register with the openings 23, alternate ones of the latter openings will be closed. In this manner, the material may be given relatively widely spaced discharge on the surface of the ground.

In order to provide for closing the openings 29, I have provided a pivoted elongated valve plate 31 which is pivotally secured as at 32 to the guide member 25. The valve plate 31 also constitutes a deflector when in open position, for deflecting the material downwardly and rearwardly of the hopper 10. The valve plate 31 has extending obtusely therefrom, an arm 33 with which a flexible valve operator 34 is secured by fastening members 35 and 36. The operator 34 extends loosely through a tubular sheath 37 which is extended through openings 38 and 39, through the rear and front walls of the hopper 10.

The hopper 10 has extending from the forward wall thereof an elongated handle 40 which is secured by a mounting 41 to the forward side of the front wall 11. The sheath 37 is anchored relative to the handle 40 by means of a bracket 42. The forward end of the flexible operator 34 extends beyond the sheath 37 and is secured to a valve adjusting lever 43 which is pivotally secured as at 44 in the center of a toothed quadrant 45. The hopper 10 also has fixed thereto a drawbar 46 which is braced by means of bracing members 47.

In order to provide for adjustment of the regulator plate 24 this plate has secured thereto a rearwardly extending arm 48 which extends through an opening 49 in the rear of the guide 25. The rear wall 12 of the hopper has fixed thereto a slotted bracket 50 of angle shape, and a bolt 51 extends through the arm 48 and has a wing nut 52 threaded thereonto. When the regulator 24 is to be adjusted lengthwise, the nut 52 is loosened and the bolt 51 with the arm 48 shifted for the length of the slot 53 formed in the angle member 50.

In order to provide for agitation of the material in the hopper 10, I have provided an agitator shaft 54 which is journaled through bearings 55 carried by the end walls 15. The shaft 54, between the ends thereof, is also journaled in intermediate bearings 56 carried by horizontal supporting bars 57. The shaft 54 includes oppositely pitched agitator blades 58, 59 which are fixed at their inner ends to the shaft 54. The blades 58, 59 are arranged in staggered series and each series of blades have fixed to the outer ends thereof outer lengthwise extending agitator bars 60.

The shaft 54 has fixed thereon in the hopper 10, collars 61 which bear against the bearings 55 and hold the shaft against lengthwise movement. The outer ends of the shaft 54 have fixed thereto sprockets 62 about which chains 63 are trained. The shafts 19, fixed to the wheels 18, have fixed thereto sprockets 64 about which the chains 63 are also trained. In this manner, when the device is pulled over the surface of the ground, the agitator shaft 54 will be rotated so as to provide for agitation of the material within the hopper 10.

In the use and operation of this spreader, the material is placed in the hopper 10 and the cover or closure 16 placed over the top thereof. The hopper may be attached to the rear of a tractor or other vehicle for pulling the device over the surface of the ground. The combined valve and deflector plate 31 is adjusted by swinging the lever 43 rearwardly, thereby lowering the valve and deflector plate 31.

Where it is desired to discharge the material in closely spaced ribbons on the surface of the ground, the regulator plate 24 is shifted lengthwise to position the first series of openings 28 in registry with the openings 23 and 29. If it is desired to have the material discharged in wider spaced ribbons, the regulator plate 24 is shifted to the position shown in Figure 3. In this position of the regulator plate the second series of openings 30 will be in register with alternate ones of the openings 23 and 29.

I do not mean to confine myself to the exact details of construction herein disclosed, but claim all variations falling within the purview of the appended claim.

What I claim is:

A material spreader comprising a mobile hopper formed with a plurality of laterally spaced apart discharge openings in the bottom thereof transversely of the path of the hopper, a regulating valve, a U-shaped guide member having a centrally positioned recess fixed to the bottom of the hopper slidably mounting said valve on the bottom of said hopper, said guide member being formed with two sets of openings of unequal number and differently spaced apart, each set being adapted selectively to be aligned with the openings in said hopper bottom, said valve having one series of laterally spaced apart openings for registry with the openings in said hopper, and said guide member, in one position of said valve moved transversely of the path of the hopper, said valve formed with a second series of openings of a lesser number than said first named series for registry with a correspondingly lesser number of openings in the bottom of said hopper in a second position of said valve moved transversely of the path of the hopper to provide for the discharge of a smaller quantity of material and to space the material discharged at different and more widely spaced points along said hopper.

GEORGE O. HOFFSTETTER.

REFERENCES CITED

The following references are of record in the file of this patent:

UNITED STATES PATENTS

| Number | Name | Date |
| --- | --- | --- |
| 113,022 | Craven et al. | Mar. 28, 1871 |
| 241,924 | Buswell | May 24, 1881 |
| 1,125,508 | Gaston et al. | Jan. 19, 1915 |
| 1,299,948 | Isaman | Apr. 8, 1919 |
| 1,573,493 | Heyd | Feb. 16, 1926 |
| 1,840,602 | Pender | Jan. 12, 1932 |
| 2,180,253 | Moore | Nov. 14, 1939 |